(12) United States Patent
Furuyama

(10) Patent No.: US 7,492,981 B2
(45) Date of Patent: Feb. 17, 2009

(54) LSI APPARATUS OPERATED BY OPTICAL CLOCK

(75) Inventor: Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 11/448,705

(22) Filed: Jun. 7, 2006

(65) Prior Publication Data

US 2006/0251427 A1 Nov. 9, 2006

Related U.S. Application Data

(63) Continuation of application No. PCT/JP2005/021182, filed on Nov. 11, 2005.

(30) Foreign Application Priority Data

Nov. 11, 2004 (JP) ............................. 2004-327708

(51) Int. Cl.
*G02B 6/12* (2006.01)
*H04B 10/04* (2006.01)
*H04B 10/12* (2006.01)

(52) U.S. Cl. ..................... 385/14; 398/183; 398/191

(58) Field of Classification Search ............... 385/14; 398/183, 191
See application file for complete search history.

(56) References Cited

U.S. PATENT DOCUMENTS 4,959,540 A * 9/1990 Fan et al. ............... 250/227.12
5,060,306 A 10/1991 Nakamura et al.
5,099,471 A * 3/1992 Tsukada et al. ............... 398/98
6,236,488 B1 * 5/2001 Shimizu et al. ............. 398/198
6,365,911 B1 4/2002 Furuyama

FOREIGN PATENT DOCUMENTS

| EP | 0398038 | 11/1990 |
|---|---|---|
| JP | H6-132516 | 5/1994 |
| JP | 2001-285195 | 10/2001 |

OTHER PUBLICATIONS

Debaes, et al., Receiver-Less Optical Clock Injection for Clock Distribution Networks, IEEE Journal of Selected Topics in Quantum Electronics, vol. 9, No. 2, pp. 400-409, 2003.
International Search Report for PCT/JP2005/021182 dated Jul. 12, 2006.
Written Opinion for PCT/JP2005/021182 dated Jul. 12, 2006.
Debaes et al, Receiver-Less Optical Clock Injection for Clock Distribution Networks, IEEE Journal of Selected Topics in Quantum Electronics, vol. 9, No. 2, pp. 400-409, Mar./Arp. 2003.

\* cited by examiner

*Primary Examiner*—Sung H Pak
*Assistant Examiner*—Daniel Petkovsek
(74) *Attorney, Agent, or Firm*—Amin, Turocy & Calvin, LLP

(57) ABSTRACT

In an LSI system, a short optical pulse train is guided to an optical divider which divides the short optical pulse train into first and second short optical pulse trains. A retardation of ½ of the pulse period is produced between the first and second short optical pulse trains. The first and second short optical pulse trains are guided to first and second photodiodes on an LSI chip and are converted in the first and second electric current pulse trains, respectively. The first and second electric current pulse trains are supplied to an electrical clock output terminal electrically connected to the first and second photodiodes so that the electrical clock output terminals generates an electric clock pulse.

31 Claims, 7 Drawing Sheets

LSI APPARATUS OPERATED BY OPTICAL CLOCK

CROSS-REFERENCE TO RELATED APPLICATIONS

This is a Continuation Application of PCT Application No. PCT/JP2005/021182, filed Nov. 11, 2005, which was published under PCT Article 21(2) in English.

This application is based upon and claims the benefit of priority from prior Japanese Patent Application No. 2004-327708, filed Nov. 11, 2004, the entire contents of which are incorporated herein by reference.

BACKGROUND OF THE INVENTION

1. Field of the Invention

The present invention relates to an LSI apparatus operated by an optical clock, particularly, to an LSI apparatus operated by an optical clock, in which a clock is optically distributed to an LSI chip for processing a signal at a high speed so as to convert the optical clock into an electric clock for operating the LSI.

2. Description of the Related Art

With improvement of the performance of an electronic device such as a bipolar transistor or an electric field effect transistor (FET), the operating speed of the large scale integration circuit (LSI) has been drastically improved in recent years. However, the improvement in the performance of the LSI, which is achieved by the miniaturization of the transistors, is accompanied by a serious problem. Specifically, the electric wiring for connecting the miniaturized transistors to each other has also been miniaturized so as to increase the wiring resistance and the capacitance between adjacent wirings. The increase in the capacitance between adjacent wirings, which poses a serious problem, now provides a bottle neck in respect of the further improvement in the performance of the LSI. The particularly serious problem resides in the distribution of the clocks to the internal circuit parts of the LSI. To be more specific, the reaching time of the clock signal differs depending on the arranging position of the LSI circuit part so as to make it difficult to achieve the operation in synchronism with the logic circuit. The particular problem is being made more and more serious in recent years.

In view of the above-noted problem in respect of the electric wiring, several ideas are proposed in, for example, Japanese Patent Disclosure (Kokai) No. 6-132516 in respect of the optical wiring LSI for optically connecting the inner regions of the LSI. It should be noted that the optical wiring permits easily achieving the wiring capable of distributing signals at scores of Gbps from the direct current because the optical wiring is substantially free from the dependency of the loss on the frequency under the frequency not more than 100 GHz and the wiring path is free from the electromagnetic interference. Also, as a method for simplifying the amplifying circuit on the photo-detector side and for suppressing the jitter of the distributed clock signals, a method for receiving two short optical pulse trains by using two photodiodes that are connected in series is disclosed in, for example, "IEEE JOURNAL OF SELECTED TOPICS IN QUANTUM ELECTRONICS, VOL. 9, NO. 2, MARCH/APRIL 2003, PP. 400-409".

In the distributing method of the optical clock signals disclosed in the literature quoted above, however, it is necessary to distribute individually the two short optical pulses, which are hereinafter referred to as "set pulse" and "reset pulse". Also, in the system using the clock distributing tree, which is disclosed in the Japanese Patent document quoted above, the optical pulses are distributed through a large number of branched portions, with the result that it is difficult to align the wiring length and the light amount thereof for the set pulse and the reset pulse. It follows that the dependency on the site such that the reaching timing of the set pulse and the reset pulse differs depending on the site is not negligible, with the result that the clock jitter is substantially generated in the entire LSI system. It should also be noted that a bias drift is generated in the clock signal by the difference in the light amount between the set pulse and the reset pulse so as to give rise to the problem that the jitter is substantially increased by the warp in the width of the clock pulse or the change thereof.

BRIEF SUMMARY OF THE INVENTION

An object of the present invention is to provide an LSI apparatus operated by an optical clock, which permits optically distributing the clocks, which are subjected to a high speed signal processing, to an LSI and also permits diminishing the clock distribution jitter.

According to an aspect of the present invention, there is provided an apparatus, comprising:

an LSI apparatus including a semiconductor device, a plurality of first and second photodiodes formed at the semiconductor device, and electrical clock output terminals formed at the semiconductor device, each of the electrical clock output terminals being electrically connected to the first and second photodiodes, the first and second photodiodes independently sensing first and second short optical pulse trains which have different phases and are incident from the outside of the LSI apparatus and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the semiconductor device.

According to anther aspect of the present invention, there is provided a system, comprising:

an optical source configured to generate a short optical pulse train;

an optical divider configured to divide the short optical pulse train from the optical source into first and second short optical pulse trains;

a retarding member configured to retard one of the first and second short optical pulse trains by the time corresponding to ½ of the pulse period;

an LSI chip provided with a plurality of first and second photodiodes and electrical clock output terminals each electrically connected to the first and second photodiodes, the first and second photodiodes independently sensing the first and second short optical pulse trains and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the LSI; and an optical system configured to guide the first and second short optical pulse trains from the retarding member to the first and second photodiodes, respectively.

According to yet another aspect of the present invention, there is provided an LSI system, comprising:

an optical source configured to generate a short optical pulse train;

an optical divider configured to divide the short optical pulse train from the optical source into first and second short optical pulse trains which are linearly polarized in first and second planes;

a retarding member configured to retard one of the first and second short optical pulse trains by the time corresponding to ½ of the pulse period;

a multiplexing unit configured to multiplex the first and second short optical pulse trains into a multiplexed optical pulse train having the first and second linearly polarized planes;

an LSI chip provided with a plurality of first and second photodiode structures and electrical clock output terminals each electrically connected to the first and second photodiode structures, the first and second photodiode structures selectively sensing the first and second short optical pulse trains in the multiplexed optical pulse train and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the LSI; and an optical system configured to guide the multiplexed optical pulse train from the retarding member to the first and second photodiode structures, respectively.

According to further aspect of the present invention, there is provided an LSI system, comprising:

an optical source configured to generate a short optical pulse train having a pulse width, the short optical pulse being in circular polarization;

a first optical fiber configured to guide the short optical pulse train so as to maintain the circular polarization of the short optical pulse train;

an optical divider configured to divide the short optical pulse train guided from the first optical fiber into first and second short optical pulse trains which are in linear polarization in first and second planes, respectively;

a second optical fiber configured to guide the first short optical pulse train so as to maintain the circular polarization in the first plane;

a third optical fiber configured to guide the second short optical pulse train so as to maintain the circular polarization in the second plane, a retardation of ½ of the pulse period being produced between the first and second short optical pulse trains;

a multiplexing unit configured to multiplex the first and second short optical pulse trains into a multiplexed optical pulse train having the first and second linearly polarized planes;

an LSI chip provided with a plurality of first and second photodiode structures and electrical clock output terminals each electrically connected to the first and second photodiode structures, the first and second photodiode structures selectively sensing the first and second short optical pulse trains in the multiplexed optical pulse train and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the LSI; and an optical system configured to guide the multiplexed optical pulse train from the multiplexing unit to the first and second photodiode structures, respectively.

DETAILED DESCRIPTION OF THE INVENTION

Before arriving at the LSI apparatus operated by an optical clock according to the embodiment of the present invention, the present inventors studied the distribution of the optical clock by the method described in IEEE JOURNAL OF SELECTED TOPICS IN QUANTUM ELECTRONICS, VOL. 9, NO. 2, MARCH/APRIL 2003, PP. 400-409 referred to previously.

Figure 1:
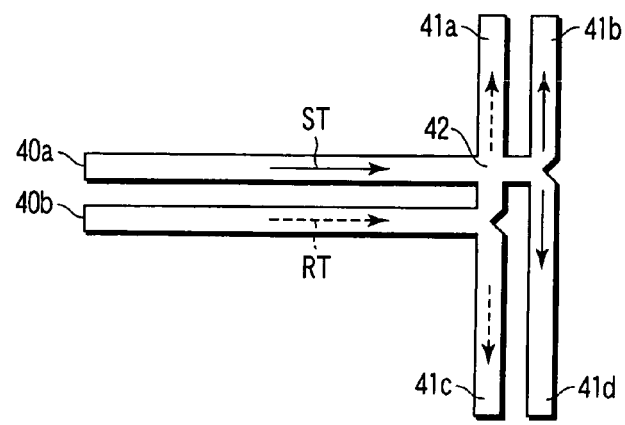
FIG. 1 schematically shows an optical waveguide arrangement of a general optical distributor for distributing the optical clocks.

In the distribution of the optical clock disclosed in the literature quoted above, it is necessary to arrange two optical waveguides in parallel. However, in the arrangement disclosed in the literature quoted above, it is difficult to branch each of two parallel optical waveguides in the branching point shown in Japanese Patent Disclosure No. 6-132516 referred to previously, into two parallel optical waveguides such that the two branched optical waveguides are allowed to have the optical paths having exactly the same length. In the particular arrangement, one of the two parallel optical waveguides, i.e., input optical waveguides is branched such that the branched two optical waveguides, i.e., output optical waveguides are made to differ from each other in the length of the optical path by the distance equal to the distance between the two parallel optical waveguides, i.e., the input optical waveguides before the branching as shown in FIG. 1.

Figure 2:
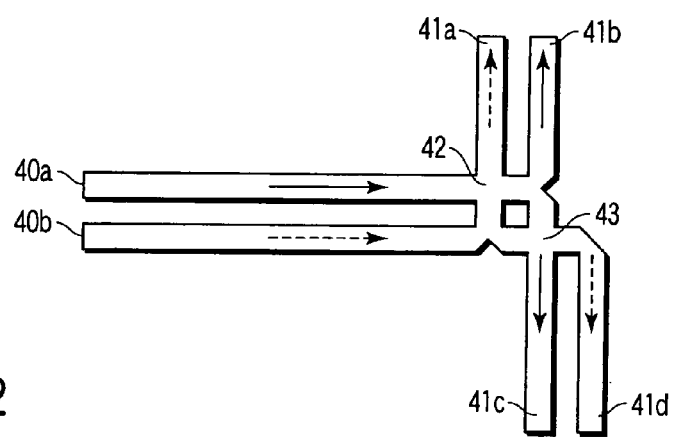
FIG. 2 also shows schematically an optical waveguide arrangement of a general optical distributor for distributing the optical clocks.

FIG. 2 shows input optical waveguides 40a, 40b and output optical waveguides 41a to 41d. The arrows shown in FIG. 1 denotes the traveling directions of the optical waves ST, RT corresponding to the set pulse and the reset pulse, respectively, which are supplied simultaneously. It should be noted that the output optical waveguides 41a and 41b are equal to each other in the length of the optical path. Therefore, in the particular optical waveguide arrangement, the set pulse and the reset pulse are generated at substantially the same timing from the output optical waveguides 41a and 41b. However, the output optical waveguides 41c and 41d differ from each other in the length of the optical path and, thus, the optical waves are generated as the set pulse and the reset pulse from the optical waveguides 41c and 41d at different timings. It follows that it is necessary to correct the timing of one of the set pulse and the reset pulse by arranging an optical path control section such as a dummy folding section in the output optical waveguides 41c and 41d differing from each other in the length of the optical path. Also, it is possible to arrange the output optical waveguides as shown in, for example, FIG. 2 so as to align the lengths of the optical paths of the optical waveguides forming a pair. In the arrangement shown in FIG. 2, it is possible to align the length of the optical paths for the set pulse and the reset pulse. However, the branched two sets of the output optical waveguides are made asymmetric in respect of the spatial output position and the output timing. It follows that it is necessary to adjust the entire layout in a manner to correct the output position and the output timing.

In the distributing method of the optical clock, which is developed from the method disclosed in IEEE JOURNAL OF SELECTED TOPICS IN QUANTUM ELECTRONICS, VOL. 9, NO. 2, MARCH/APRIL 2003, PP. 400-409 referred to previously, the layout of the optical waveguides is limited and, thus, it is necessary to take the layout of the optical waveguides into consideration. Also, in the arrangement shown in each of FIGS. 1 and 2, it is necessary to consider the situation that the arrangement of the set pulse and the reset pulse after the branching is changed from the arrangement before the branching as to whether the set pulse and the reset pulse are arranged on the right side or the left side relative to the traveling direction of the pulse. In some cases, it is necessary to arrange a dummy space in view of the particular arrangement of the set pulse and the reset pulse noted above. In addition, cross points between the input optical waveguide and the branched output optical waveguides are generated as denoted by reference numeral 42 in FIG. 1 and references numerals 42 and 43 in FIG. 3. Since the light propagating distance which corresponds to an optical path length is changed slightly in the cross point, a problem is generated that the timing of the outputs of the set pulse and the reset pulse is changed slightly in spite of the situation that the optical waveguides 41a and 41b are basically equal to each other in length of the optical path.

It may be reasonable to state that the difference in the length of the optical wiring (length of the optical path) noted above does not generate a serious problem if only one branching portion is included in the optical wiring. However, in the clock distribution for the LSI apparatus requiring the clock distribution to scores of thousands to hundreds of thousands of the distributing points, it is substantially insignificant to distribute the clocks to only two points. It is necessary to distribute the clocks to at least scores of points to hundreds of points as the semi-master clocks. It follows that in the case of employing the distributing method of the optical clocks described in IEEE JOURNAL OF SELECTED TOPICS IN QUANTUM ELECTRONICS, VOL. 9, NO. 2, MARCH/APRIL 2003, PP. 400-409 referred to previously in the situation requiring a large distributing points as pointed out above, the local dependency of the reaching timing of the set pulse and the reset pulse is not negligible, substantially resulting in the formation of the clock jitter in the entire LSI apparatus.

It should also be noted that, if the set pulse and the reset pulse are individually branched a plurality of times, a problem is generated that a difference in the amounts of the reaching optical beams is generated between the route for the set pulse and the route for the reset pulse. The problem is based on the situation that, since the branched portions are somewhat uneven in the branching ratio, it is difficult to permit the accumulated value for the route of the set pulse to coincide perfectly with the accumulated value of the route for the reset pulse. For example, in the case of distributing the clock signals to 1024 clock distributing points, which corresponds to the case of dividing 10 times each of the set pulse and the reset pulse into two divided sections, the maximum final difference in the light amount is about 4% on the assumption that the branching ratio error is 0.1%, i.e., the pulse is branched into 50.1% of one section and into 49.9% of the other section. In this case, the absolute value of the clock voltage is drifted by 4% for every clock, with the result that a drift in an amount corresponding to the clock amplitude is generated only 25 clocks later. Also, since unevenness is generated in the difference in the light amount between the reaching set pulse and the reaching reset pulse for every clock distribution point, unevenness is also generated in the drift amount described above.

In the optical clock LSI apparatus and the optical clock LSI system of the present invention described in the following, it is possible to decrease the clock distribution jitter and to solve the other problems such as the equal length wiring and the equal intensity wiring.

The LSI systems operated by the optical clock according to some embodiments of the present invention will now be described with reference to the accompanying drawings.

First Embodiment

Figure 3:
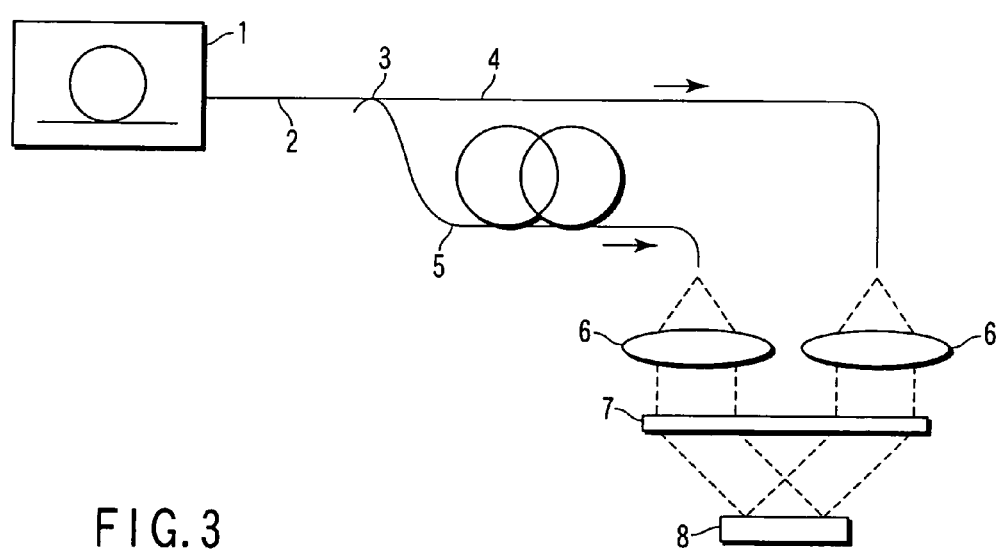
FIG. 3 schematically shows an optical arrangement of an LSI system operated by an optical clock according to a first embodiment of the present invention.

FIG. 3 schematically shows an optical waveguide arrangement of the LSI system operated by the optical clock according to a first embodiment of the present invention.

Reference numeral 1 shown in FIG. 3 denotes a short optical pulse source for generating a short optical pulse. The short optical pulse generated from the pulse source 1 is guided by an optical fiber 2, and the guided short optical pulse is divided into two components by an optical divider 3, i.e., a two-branching optical fiber coupler. The two branched components of the short optical pulse are guided by optical fibers 4 and 5, respectively, and collimated by collimate lenses 6. Then, the collimated optical pulse components are incident on a diffraction grating 7. The diffraction grating 7 permits the short optical pulse to be incident on an LSI apparatus, i.e., an LSI chip 8 at a prescribed incident angle. In the system shown in FIG. 3, the optical fiber 5 is set longer than the optical fiber 4 by an amount corresponding to ½ of the clock period. In other words, the lengths of the optical fibers 4 and 5 are set to bring about a difference in time of ½ period between the two-branched short optical pulses.

In the system shown in FIG. 3, a mode lock fiber laser for generating a laser beam having a pulse width of, for example, 10 ps and a repeating frequency of 10 GHz is used as the short optical pulse source 1. If a PrYb-doped fiber is used as a gain medium of the mode lock fiber laser, it is possible to transfer the optical wave having an oscillating wavelength of 635 nm or 720 nm, with the result that the transferred optical wave can be received directly even by a Si-series photo sensor described herein later. Also, an oscillating wavelength of 1.55 µm is used in many cases in the mode lock fiber laser for the optical communication, which uses an Er-doped fiber as the gain medium. In this case, it is advisable to use, for example, a GaInAs/InP series element as the photo sensor.

The optical fiber 2 is formed of, for example, a quartz-based single mode optical fiber, and the optical divider, i.e., the two-branching optical fiber coupler 3 is formed of a 3 dB coupler having two optical fibers fused to each other at the tapered regions. Each of the optical fibers 4 and 5 may be substantially same type of the optical fiber 2. It should be noted, however, that the optical fiber 5, which is used as a retarding optical fiber, is set longer than the optical fiber 4 so as to retard the optical pulse in a time period corresponding to ½ of the clock period. The retarding amount of the optical fiber 5, i.e., the difference in length between the optical fibers 4 and 5, is set at 10.2 mm in the case of the quartz-based single mode fiber having an effective refractive index of about 1.47. Where optical waves having a clock frequency of 10 GHz are generated from the optical fibers 5 and 4, the retarding length of the optical fiber 5 is set in a manner to bring about a retarding time of 50 ps in the optical waves.

The collimate lens 6 is shown as a single lens in FIG. 3 for simplifying the drawing. However, it is possible to use any of the single lens and the complex lens as the collimate lens 6 as far as the short pulse light beams coming from the optical fibers 4 and 5 can be collimated by enlarging the short pulse optical beams to the size of the LSI chip 8.

The diffraction grating 7 is mounted in order to bend the short pulse optical beam collimated by the collimate lens 6, i.e., the short optical pulse, in the in-phase, i.e., the same phase at a prescribed angle. It is possible to use, for example, a transmission type brazed diffraction grating as the diffraction grating 7. The lattice density of the diffraction grating is set at, for example, 982 lines/mm. In this case, it is possible to bend the diffraction beam having a wavelength of 720 nm in a direction of about 45°. Also, it is advisable to set the brazed angle of the diffraction grating 7 at, for example, 30°. Incidentally, it is possible for the reflection type diffraction grating to be used as the diffraction grating 7, and it is possible to interchange the positions of the diffraction grating 7 and the LSI chip 8 shown in FIG. 3. In this case, the irradiating surface of the LSI chip 8 is arranged to face downward toward the diffraction grating 7.

Figure 4:
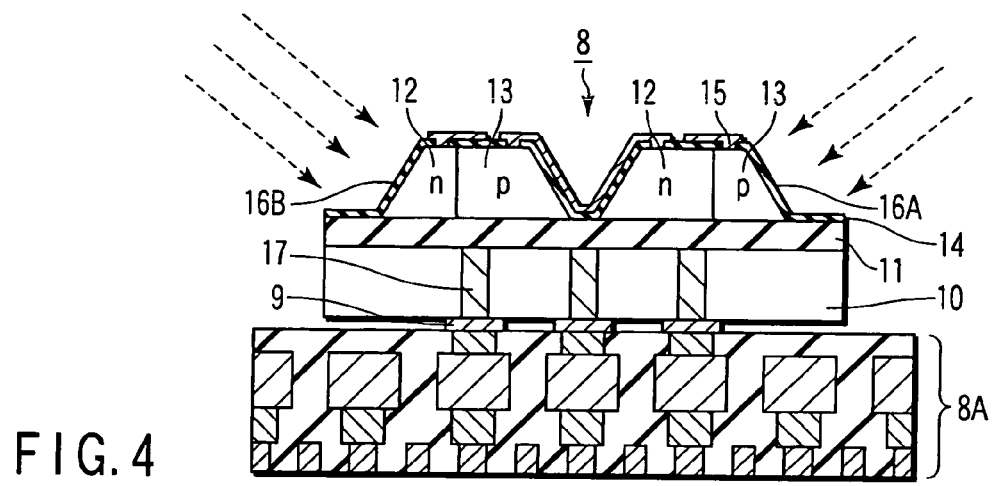
FIG. 4 is a cross sectional view schematically showing a structure of the photo sensor included in the LSI system shown in FIG. 3.

In the optical system described above, the LSI chip 8, i.e., the LSI apparatus is alternately irradiated with the short optical pulse from the left side and the right side at an interval of 50 ps. If the two photo sensors mounted on the LSI chip 8 have incident surfaces facing different directions, i.e., being inclined at different incident angles, respectively, and the two short optical pulses are independently received by two photo sensors, two electric short pulses (current pulses) each having a period of 100 ps are formed at a phase difference of 50 ps. In the LSI chip 8, the two photo sensors correspond, respectively, to the photodiodes, and the two photodiodes are connected in series such that the anode of one photodiode is connected to the cathode of the other photodiode. In this series connection, the electric capacity as viewed from the connecting point of the two photodiodes, which corresponds to the capacitance having the total capacitance of the two photodiodes, is charged and discharged so as to form an electric clock pulse at the connecting points between the two photo sensors. FIG. 4 exemplifies the construction of the LSI chip 8.

Specifically, FIG. 4 is a cross sectional view schematically showing the structure of the photodiode pair which can separately receive the light beams coming from different directions. As shown in the drawing, the photodiode pair are mounted to the upper layer 8a of the multi-layered wiring of the LSI chip.

As shown in FIG. 4, a Si substrate 10 having the photodiode pair formed thereon is mounted to the multi-layered wiring of the LSI chip. Penetrating electrodes 17 are formed in the Si substrate 10. Each of these penetrating electrodes 17 is electrically connected to the multi-layered wiring of the LSI chip via a connection bump electrode 9. A separating film ($SiO_2$) 11 is formed on the Si substrate 10, and an n-type Si region 12 and a p-type Si region 13, which are connected to each other, are formed on the separating film ($SiO_2$) 11. The n-type Si region 12 and the p-type Si region 13 are covered with a passivation film ($SiO_2$) 14. Contact holes are formed in the passivation film ($SiO_2$) 14, and a wiring electrode 15 connected to the n-type Si region 12 and the p-type Si region 13 via the contact holes is allowed to extend over the passivation film ($SiO_2$) 14. The inclined regions of the passivation film ($SiO_2$) film 14, which are not covered with the wiring electrode 15, are defined as light-receiving planes 16A, 16B. As denoted by broken lines, the light-receiving planes 16A, 16B are irradiated with the short optical pulse.

The construction shown in FIG. 4 corresponds to the construction prepared by forming photodiodes on a so-called "SOI (Silicon On Insulator) substrate". In this case, the Si substrate 10 is insulated from the n-type Si region 12 and the p-type Si region 13 by the separating film 11. It follows that the element shown in FIG. 4 electrically represents the photodiode pair in which the anode electrode of one photodiode is connected in series to the cathode electrode of the other photodiode.

Also, if the element shown in FIG. 4 is formed by an anisotropic etching such that the surface of the Si crystal is formed of the (100) plane, and the side surface (inclined surface) is formed of the (111) plane, the inclined side surface forms an angle of inclination of 54.7°. It follows that, if the element shown in FIG. 4 is irradiated with two short optical pulse beams at an angle of 45° as shown in FIG. 3, the photodiode facing the irradiating direction of one optical pulse beam is not irradiated with the other optical pulse beam, with the result that the two photodiodes are allowed to receive different light beams. It follows that it is possible to allow one photodiode to receive the set pulse (short optical pulse) and to allow the other photodiode to receive the reset pulse (short optical pulse). The operation of the element constructed as shown in FIG. 4 will now be described with reference to FIG. 5.

Figure 5:
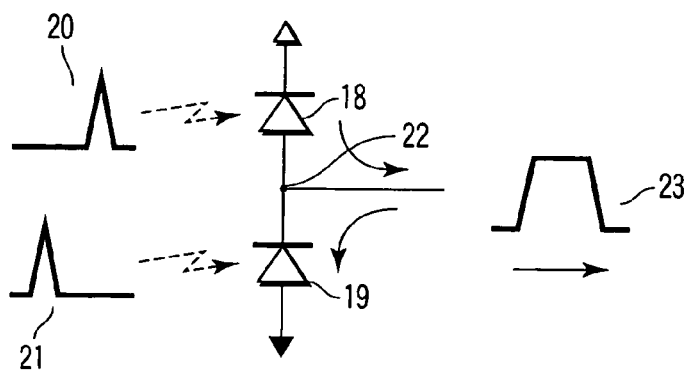
FIG. 5 is an equivalent circuit diagram for describing the operation of the photo sensor shown in FIG. 4.

FIG. 5 is an equivalent circuit diagram for describing the situation that the element constructed as shown in FIG. 4 is operated in response to the set pulse and the reset pulse. A reference numeral 18 shown in FIG. 5 denotes a photodiode for the set pulse, a reference numeral 19 denotes a photodiode for the reset pulse, a reference numeral 20 denotes a set pulse (short optical pulse), a reference numeral 21 denotes a reset pulse (short optical pulse), a reference numeral 22 denotes a connecting point between the anode of the photodiode for the set pulse and the cathode of the photodiode for the reset pulse, and a reference numeral 23 denotes an electric clock pulse generated from the connecting point 22.

As apparent from FIG. 5, if the set pulse 20 is supplied, the photodiode 18 generates a photocurrent so as to charge the floating capacitor (not shown) at the connecting point 22. At this stage, the photodiode 19 is free from the photocurrent and, thus, is under the de-energized state. Also, the floating capacitor at the connecting point 22, which is actually charged, has a capacitance equal to the sum of the parasitic capacitance of the two photodiodes. If the reset pulse 21 is supplied in the next step, a photocurrent is generated in the photodiode 19 so as to discharge the floating capacitor at the connecting point 22. In this stage, the photodiode 18 is free from the photocurrent and, thus, is under the de-energized state. Since the operation described above is periodically repeated, the voltage at the connecting point 22 is alternately switched between the "H" level and the "L" level so as to generate a clock signal having a period of 100 ps and a frequency of 10 GHz.

As an example of the output voltage, suppose that the total capacitance of the two photodiodes is 20 pF, the set/reset pulse width is 10 ps, the conversion efficiency of the photodiode is 0.4 A/W, the fiber laser output is 200 mW, and the clock is distributed at 100 points. In this case, the power of the short optical pulse is 100 mW by the division of the set/reset pulse, is 1 mW by the division by 100 in the case of covering the LSI chip with 100 photo sensor pairs, and is 50 μW if the light-receiving efficiency is 5% so as to form an electric clock pulse of about 10 mW.

If the connecting point 22 is connected to a contact point having sufficiently high impedance, e.g., connected to the FET gate or to a large resistance load, it is possible to take out the electric clock pulse from the FET or the load resistance. In this case, it is possible to suppress easily the drift component of the output voltage by inserting a coupling capacitor into the connecting route so as to permit the resistor having a resistance of, for example, 100 kΩ to 10 MΩ, to form a bias network in the case of a relatively large resistor, e.g., the photodiode capacitor referred to above. The bias network represents a circuit in which resistors having the same resistance falling within a range of 100 kΩ to 10 MΩ are connected between the high potential power source (the power source side of a single power source or the positive power source side of two power sources) and the output point of the coupling capacitor and between the output point of the coupling capacitor and the low potential power source (the ground side of a single power source or the negative power source side of two power sources).

It should also be noted that, if a similar bias network (resistance network) is also formed in the input point of the coupling capacitor corresponding to the connecting point 22, it is possible to suppress the output saturation, i.e., the phenomenon that the drift caused by the drift of the clock output voltage in the case where the set pulse and the reset pulse are in asymmetry permits the bias value to reach the high potential power source or the low potential power source.

Figure 6:
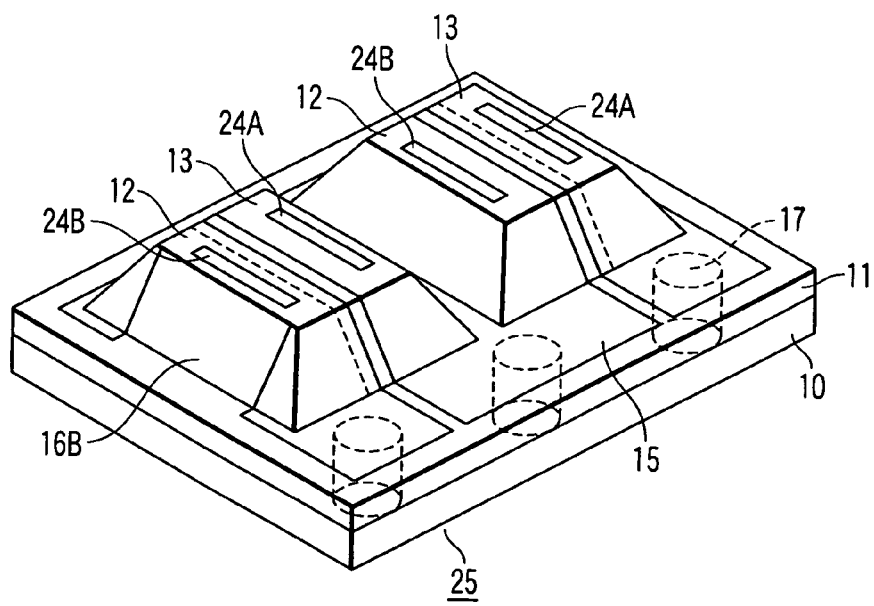
FIG. 6 is an oblique view schematically showing an outer appearance of the photo sensor shown in FIG. 4.

FIG. 6 is an oblique view showing the outer appearance of the photodiode shown in FIG. 4. A reference numeral 24a shown in FIG. 6 denotes a p-electrode contact hole, a reference numeral 24b denotes an n-electrode contact hole, a reference numeral 25 denotes the entire element. As shown in FIG. 6, the penetrating electrode 17 for connection to the LSI chip is connected to a part of the electrode 15 withdrawn from the light-receiving region. Also, the n-type Si region 12 and the p-type Si region 13 are formed on the SOI substrate as shown in FIG. 6, and the two photo sensors are spatially separated from each other by removing the Si crystal positioned between the two photo sensors. No problem is generated in terms of the electric operation even if the Si crystal positioned between the two photo sensors is not removed. However, in order to prevent the afterglow of the received light from being transmitted to the adjacent photo sensor through the Si crystal, the two photo sensors are physically separated from each other. If the two photo sensors are formed sufficiently apart from each other, it is possible to form the two elements consecutively.

Figure 7:
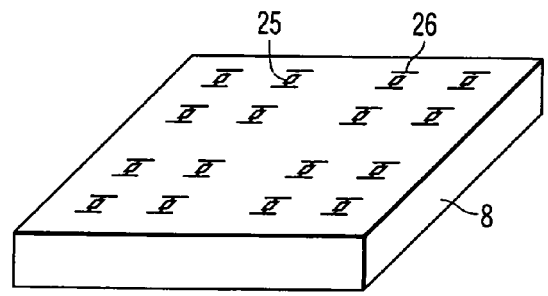
FIG. 7 is an oblique view schematically showing a surface of the LSI chip shown in FIG. 3.

FIG. 7 schematically shows the surface portion of the LSI chip or LSI apparatus 8. A reference numeral 25 shown in FIG. 7 denotes a photo sensor or the connecting portion of the photo sensors, and a reference numeral 26 denotes an electric wiring for the clock distribution. As described previously, the LSI generally has scores of thousands to hundreds of thousands of clock distributing points. It is not necessarily effective to supply clocks to these clock distributing points by utilizing light beams. For example, the output power of the short optical pulse source is increased with increase in the number of clock supply points so as to increase the burden of the short optical pulse source. Also, the photo sensor is required to have a light-receiving section. If the size of the photo sensor is set at scores of nanometers, the light-receiving section fails to have a sufficiently long light-absorbing region and, thus, the light-receiving region is rendered incapable of receiving sufficiently the optical clock. By contraries, in the case of arranging a sufficiently long light-absorbing region, the allowable space occupies the space that is at most scores of times as large as that in the ordinary case, with the result that the miniaturization of the LSI is rendered insignificant.

It follows that it is necessary for electric clocks to be generated in synchronism with the optical clocks in regions that are reasonably spaced apart from each other and to be distributed electrically. In distributing the electric clocks, it is possible for the wiring to be maintained at the same length in order to prevent the delay in the distribution of the signals from being caused by the difference in the wiring length in a relatively short region. It is possible to realize a photoelectric complex clock distribution system by arranging the photo sensors or the connecting portions 25 of the photo sensors in a dispersed fashion as shown in FIG. 7. In this case, the optical clocks are supplied to each section of the LSI apparatus relatively as a whole and the electric clocks are distributed from each section by the electric wiring of the same length while securing the synchronous properties by the optical clock. The electric wiring 26 shown in FIG. 7 denotes the wiring in a region close to the surface layer, and a further subdivided clock wiring (not shown) is arranged below the electric wiring 26.

Figure 8:
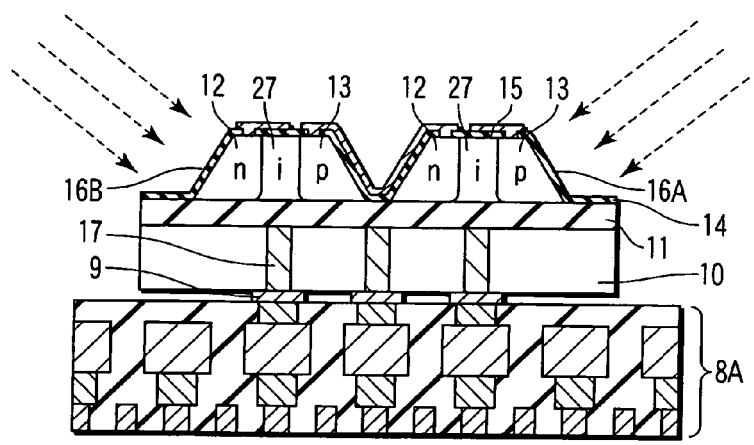
FIG. 8 is a cross sectional view schematically showing another structure of the photo sensor shown in FIG. 3.

FIG. 8 shows the construction according to a modification of the photodiode shown in FIG. 4. In the construction shown in FIG. 8, a low concentration (i-type) layer 27 is formed between the p-type Si region 12 and the n-type Si region 13. The particular construction is a pin type structure widely known to the art for use for a high speed operation and indicates that the present invention can also be applied to a pin type structure without giving rise to any problem. It follows that various materials such as GaInAs/InP, GaAs/GaAlAs and SiGe/Si can be used in the present invention.

As described above, according to the system shown in FIG. 3, the short optical pulse train can be divided into two short optical pulse trains by the optical divider 3. Then, one short optical pulse train is retarded by the time corresponding to ½ of the clock period, compared with the other short optical pulse train, because of the difference in length between the optical fibers 4 and 5. Then, the diffraction grating 7 permits the two short optical pulse trains including the delayed short optical pulse train to be transmitted in a prescribed direction in the same phase. The LSI chip or the LSI apparatus 8 is irradiated with the two short optical pulse trains transmitted in different directions, and the short optical pulse train is detected by the photodiodes arranged in the LSI chip or the LSI apparatus 8. It follows that the simultaneous distribution by the multiplex space is realized by minimizing the number of divisions of the short optical pulse so as to ensure the same length properties of the clock distribution and the same intensity properties of the set pulse and the reset pulse.

It follows that it is possible to realize an optical clock LSI free from an excessive jitter caused by the receiving circuit and small in the space dispersion and in the change with time of the jitter caused by the clock distribution route. In the optical clock LSI system or the LSI apparatus shown in FIG. 3, it is possible to realize a direct clock of 10 GHz and a multiplied clock of 20 to 160 GHz so as to make it possible to realize a clock supply for a super high speed LSI for the next generation. It follows that the present invention greatly contributes to the improvement in the performance of, for example, the information communication apparatus.

Second Embodiment

Figure 9:
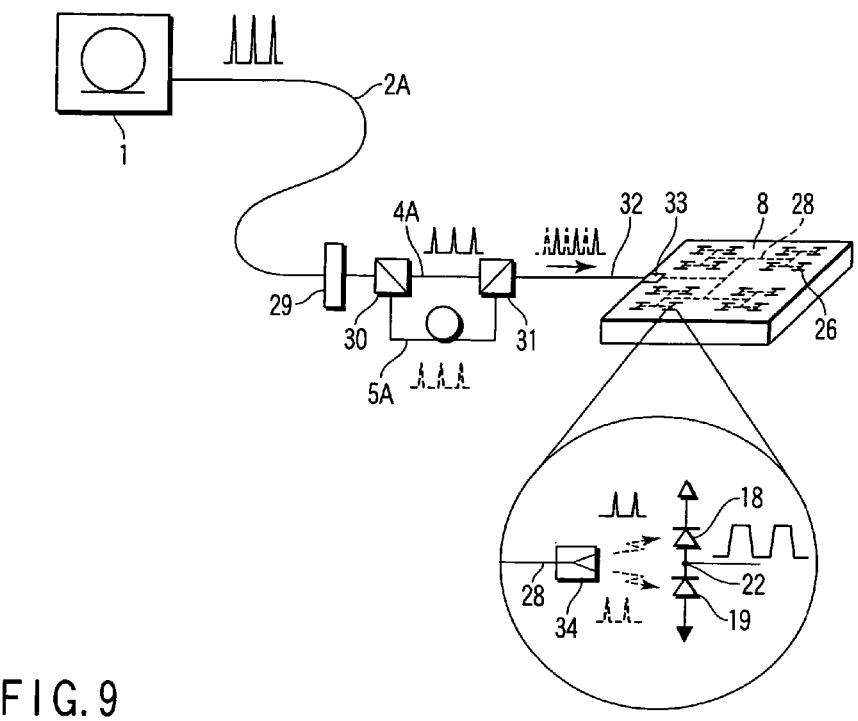
FIG. 9 schematically shows an optical waveguide arrangement of the LSI system operated by an optical clock according to a second embodiment of the present invention.

FIG. 9 schematically shows the construction of an optical clock LSI system according to a second embodiment of the present invention.

A reference numeral 1 shown in FIG. 9 denotes a short optical pulse source for generating a short optical pulse. In the system shown in FIG. 9, the short optical pulse is guided by an optical fiber 2A while preserving the polarized plane of the short optical pulse that is linearly polarized so as to be incident on a wave plate 29. In the wave plate 29, the linearly polarized light beam is converted into a circularly polarized light beam, and the circularly polarized light beam is separated by a polarized beam splitter 30 acting as a de-multiplexing element into light beam components having polarized planes perpendicular to each other. The light beam component having one of the polarized planes perpendicular to each other is guided by a fiber 4A into a multiplexing element 31 while retaining the polarized plane. Also, the light beam having the other polarized plane is guided into the multiplexing element 31 by a fiber 5A while retaining the polarized plane. The fiber 5A is set longer than the fiber 4A such that a delay corresponding to ½ of the clock period is generated between the two light beams. It follows that, in the multiplexing element 31, two light beam components having a phase difference corresponding to ½ of the clock period are de-multiplexed into a single light beam, and the single light beam is guided into a mode size converter 33 formed in a input port of the LSI chip 8 via an optical fiber 32 retaining the polarized plane. In the mode size converter 33, the mode size of the de-multiplexed light beam is converted so as to be guided into an optical waveguide 28. Further, the de-multiplexed light beam is guided by the optical waveguide into a local polarized beam separator 34 connected to the optical waveguide within the LSI 8 so as to be separated in the local polarized beam separator 34 into light beam components having different polarized planes. One of the separated light beam components is allowed to be incident as a set pulse on the photodiode 18 for the set pulse and the other separated light beam component is allowed to be incident as a reset pulse on the photodiode 19 for the reset pulse. As a result, an electric clock is generated from the connecting point 22 between the anode of the photodiode 18 for the set pulse and the cathode of the photodiode 19 for the reset pulse, as described previously.

A mode lock fiber laser for generating a laser having a pulse width of, for example, 10 ps and a repeating frequency of 10 GHz is used as the short optical pulse source 1. A polarizing plane-preserving fiber is used as the optical fiber for the mode lock fiber laser used in this embodiment. If a PrYb-doped fiber is used as the gain medium, it is possible to obtain an oscillation wavelength of 635 nm or 720 nm in the linearly polarized output. It is possible even for a Si-based photo sensor to receive directly the oscillated wave. Also, an oscillating wavelength of 1.55 μm is used in many cases in the mode lock fiber laser for the optical communication, which uses an Er-doped fiber as the gain medium. In this cases, it is advisable to use, for example, a GaInAs/InP series element as the photo sensor.

The wave plate 29, which is formed of, for example, a λ/4 plate, serves to convert the linearly polarized light beam supplied from the polarized wave-preserving optical fiber 2A into a circularly polarized light beam. It suffices for the wave plate 29 and the polarized beam splitter 30 to be optically coupled with each other by the free space coupling. The circularly polarized beam is separated by the polarized beam splitter 30 into a vertical polarized beam and a horizontal polarized beam, which are supplied into the polarized plane-preserving optical fibers 4A and 5A, respectively. It is possible for the wave plate 29 to be formed of a λ/2 plate and to be used as a polarizing plate rotating device for inclining the polarized plane of the linearly polarized beam coming from the polarized wave-preserving optical fiber 2A to have an angle of 45° relative to the optical axis of the polarized beam splitter 30. It suffices for the wave plate 29 and the polarized beam splitter 30 to be optically coupled with each other by the free space coupling in this case, too.

The light beam polarized to have a polarization angel of 45° is separated by the polarized beam splitter 30 into a vertical polarized beam and a horizontal polarized beam and, then, supplied into the polarized wave-preserving optical fibers 4A and 5A, respectively. It is also possible to arrange the polarized beam-preserving fiber 2A in a manner to permit the main axis of the polarized beam-preserving fiber 2A to be inclined by 45° and to supply the light beam from the fiber 2A into the polarized beam splitter 30 without using the wave plate 29.

The polarized beam-preserving fiber 5A is set longer than the polarized beam-preserving fiber 4A by the distance corresponding to ½ of the clock period. It is advisable for the amount of the retardation amount of the polarized beam, i.e., the difference in length between the polarized beam-preserving fiber 5A and the polarized beam-preserving fiber 4A, to be set at 10.2 mm (retardation time of 50 ps and the clock frequency of 10 GHz) in the case where each of the polarized beam-preserving fibers 4A and 5A has an effective refractive index of about 1.47. After a prescribed retarding time has been imparted, the vertical polarized beam and the horizontal polarized beam supplied into the polarized beam-preserving optical fibers 4A, 5A, respectively, are further supplied into the multiplexing element 31 such that the polarizing planes are perpendicular to each other, and the composed polarized beam is generated from an optical fiber 32. It is desirable to use a so-called "collimate system" in which a collimate lens (not shown) is mounted to the edge of each of the optical fibers for the light input-output in and out of, for example, the polarized beam splitter 30 and the multiplexing element 31.

The optical fiber 32 is formed of, for example, a quartz-based single mode optical fiber or an optical coupling is performed by utilizing the free space coupling so as to prevent the polarizing planes perpendicular to each other from being mixed in the polarized beams. In the case of using a single mode optical fiber, it is possible for the polarizing plane to be rotated in the midway by, for example, the bending or twisting of the optical fiber. Therefore, it is advisable to insert a λ/2 plate so as to control the polarizing plane.

The mode size converter 33 is arranged in order to convert the mode size from the mode diameter of, for example, the optical fiber into the mode diameter of the optical waveguide 28 so as to suppress the optical coupling loss caused by the difference in the mode diameter. It is possible to use, for example, a tapered optical waveguide as the mode size converter. The optical waveguide 28 is formed of, for example, a SiON/SiO$_2$ series optical waveguide having a difference in refractive index of 0.07, and a core size of 1.2 μm□, and a wiring of the same length is mounted to a so-called "H-tree" type branch. A local polarized beam separator 34 serves to separate the two linearly polarized beams composed of the polarized beams having polarizing planes perpendicular to each other in the polarized beam multiplexing element 31 into the individual light beams. Various polarized beam splitting devices such as a coupled waveguide type and the thin film prism type using a birefringence material such as Ta$_2$O$_5$ can be applied to the local polarized beam separator 34.

In operating the optical clock LSI system or the LSI apparatus according to the second embodiment of the present invention, the linearly polarized optical wave emitted from the short optical pulse source 1 is guided by the polarized beam-preserving fiber into the polarized beam splitter 30 so as to be divided into two optical waves. In this dividing stage, it is possible to apply the method using a λ/4 plate or λ/2 plate as described previously. The divided two linearly polarized optical waves are guided by the separate polarized beam-preserving fibers 4A and 5A so as to be supplied into the polarized beam multiplexing element 31 such that the polarizing planes of the two linearly polarized optical waves are perpendicular to each other. In this case, the optical path of the polarized beam-preserving fiber 5A is set longer than that of the polarized beam-preserving fiber 4A such that the linearly polarized optical wave transmitted through the polarized beam-preserving fiber 5A is delayed by the time period corresponding to ½ of the pulse period. As a result, the optical waves or beams transmitted through the polarized beam-preserving optical fibers 4A and 5A are multiplexed in the multiplexing element 31, with the result that a multiplexed optical pulse train is generated from the polarized beam multiplexing element 31. The multiplexed optical pulse train in this case differs from the simple multiplexed optical pulse train in that the polarizing planes of the polarized waves are perpendicular to each other for each pulse and two independent optical beams are actually present together in a mixed form.

The multiplied pulse is introduced into the optical waveguide 28 of the LSI chip 8 and transferred to each clock distributing point while repeating the division. In the terminal of the optical waveguide 28, i.e., in the clock distributing point, the multiplied pulse train is separated by the local polarized beam separator so as to be brought back to the two linearly polarized light beams (short optical pulse train). An electric clock pulse can be formed as in the first embodiment by supplying the short optical pulse train into the photodiode 18 for the set pulse and into the photodiode 19 for the reset pulse.

As apparent from the description given above, the LSI system or the LSI apparatus according to the second embodiment of the present invention is featured in that it suffices for the optical waveguide to be a single line so as to overcome the problem inherent in the prior art, i.e., the problem in terms of the asymmetry in the wiring length of the paired optical waveguides. Further, the second embodiment produces an effect that it is not absolutely necessary for the branching ratio of branching device of the optical waveguide to be strictly 50%. To be more specific, even if the branching ratio in the branched portion differs by several percent, the intensity ratio of the set pulse to the reset pulse can be maintained constant because the set pulse and the reset pulse are contained in the same transmitted light beam. It should be noted, however, that a problem is generated if the branching characteristics in the branched portion are dependent on the polarized beam. Such being the situation, it is desirable to avoid the application of the branched portion utilizing the polarizing characteristics.

Third Embodiment

Figure 10:
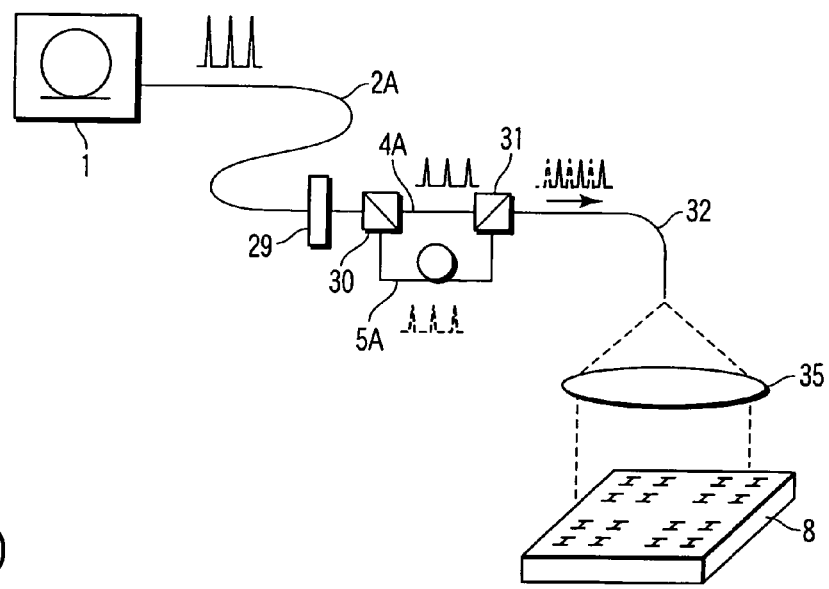
FIG. 10 schematically shows an optical waveguide arrangement of the LSI system operated by an optical clock according to a third embodiment of the present invention.

FIG. 10 schematically shows the configuration of an optical clock LSI system according to a third embodiment of the present invention.

A reference numeral 1 shown in FIG. 9 denotes a short optical pulse source. Each of reference numerals 2A, 4A and 5A denotes a polarized beam-preserving optical fiber for preserving the polarizing plane of the optical beam generated from the short pulse optical pulse source 1. A reference numeral 8 denotes an LSI chip, a reference numeral 29 denotes a wave plate, a reference numeral 30 denotes a polarized beam splitter, a reference numeral 31 denotes a multiplexing unit, a reference numeral 32 denotes an optical fiber, and a reference numeral 35 denotes a collimate lens.

The optical system between the short optical pulse source 1 and the optical fiber 32 is equal in construction and function to the second embodiment described above and, thus, the detailed description thereof is omitted. In the optical clock LSI shown in FIG. 10, a single lens is used as the collimate lens 35 for simplifying the drawing. However, the collimate lens 35 is not limited to the single lens. It is also possible to use a complex lens as the collimate lens 35 as far as it is possible to enlarge and collimate the short pulse optical beam supplied from the optical fiber 32 to the chip size of the LSI apparatus.

In the system shown in FIG. 10, the linearly polarized light beam supplied from the short optical pulse source 1 is divided or de-multiplexed into two light beams as in the second embodiment described above. One linearly polarized light beam is retarded by the time corresponding to ½ of the pulse period, and the two light beams are transmitted separately through the polarized beam-preserving optical fibers 4A and 5A so as to be supplied into the multiplexing element 31 such that the polarizing planes of the two polarized beams are perpendicular to each other. Then, a multiplied pulse train is generated from the multiplexing element 31. The multiplied light pulse is converted by the collimate lens 35 into a collimate pulse beam such that the LSI chip or the LSI apparatus 8 is irradiated with the collimate pulse beam. The collimate beam is received by two photodiodes of the polarization separation type or the polarization selective type, and an electric clock pulse is generated as in the first embodiment described previously in accordance with the set pulse and the reset pulse.

Figure 11:
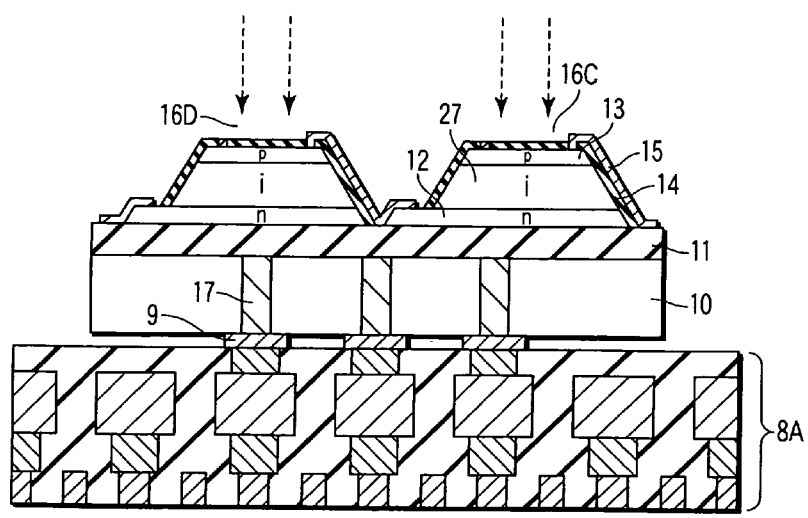
FIG. 11 is a cross sectional view schematically showing a structure of the photo sensor included in the LSI system shown in FIG. 10.
Figure 12:
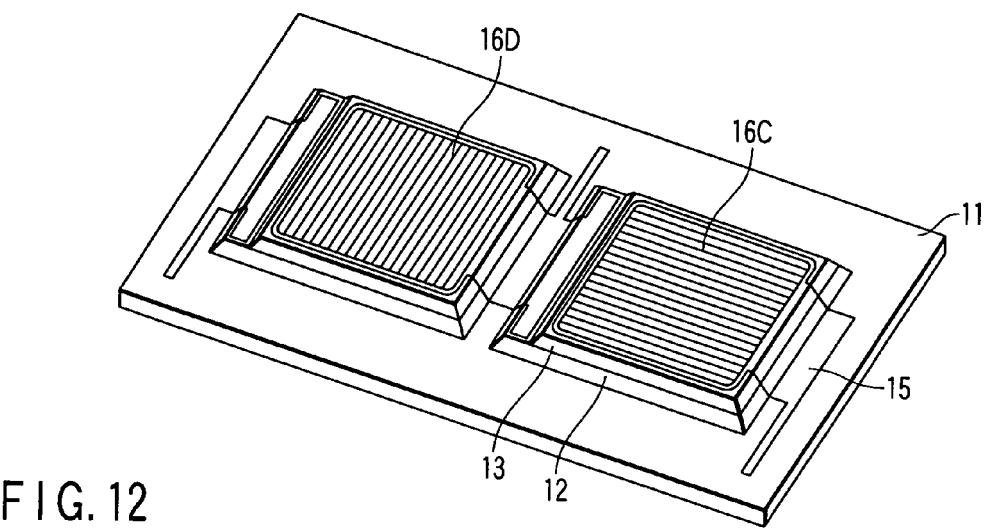
FIG. 12 is an oblique view schematically showing an outer appearance of the photo sensor included in the LSI system shown in FIG. 10.

FIGS. 11 and 12 schematically exemplify the structure and the construction of the polarization selective photodiode shown in FIG. 10. Specifically, FIG. 11 is a cross sectional view showing the structure of the photodiode array, and FIG. 12 is an oblique view showing the outer appearance of the photodiode array.

In the photodiode array shown in FIGS. 11 and 12, two photodiodes of the surface incident type are arranged side by side and a polarizing filter is arranged on each of the light incident planes. To be more specific, a separating film 11 is formed on the Si substrate 10, and a pin type photodiodes are formed on the separating film 11. In the pin type structure, a low concentration (i-type) layer 27 is formed on an n-type Si region 12, and a p-type Si region 13 is formed on the low concentration (i-type) layer 27. Further, a wiring electrode 15 is formed on each of the photodiodes of the pin type structure, and a polarizing filter is formed on the light-receiving planes 16C and 16D of the photodiodes.

In FIG. 12, the lattices indicated on the light-receiving planes 16C and 16D denote the polarizing direction of the polarizing filter. As shown in the drawing, the polarizing directions of the two photodiodes are perpendicular to each other. The polarizing filter is prepared by forming, for example, metal lattices at a pitch of 100 nm on the surfaces of the photodiodes. A polarization selective photodiode is used in this embodiment as the simplest structure. In this case, however, the half of the supplied light beam is not utilized so as to be made useless. Therefore, it is also possible to form, for example, a polarization separation prism on the photodiode so as to provide a polarization separation type photodiode.

As described above, according to the third embodiment of the present invention, it is of course possible to obtain the effect similar to that obtained in the second embodiment. In addition, the third embodiment produces an effect that, since the optical system for irradiating the LSI chip or the LSI apparatus 8 is simple, it is possible to supply clocks to a plurality of LSI chips depending on the situation.

Fourth Embodiment

Figure 13:
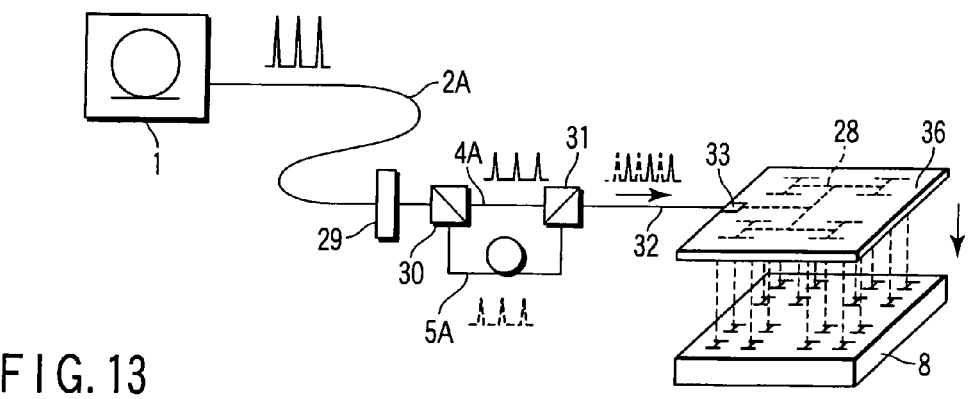
FIG. 13 schematically shows an optical waveguide arrangement of the LSI system operated by an optical clock according to a fourth embodiment of the present invention.

FIG. 13 schematically shows the construction of an optical clock LSI apparatus according to a fourth embodiment of the present invention. A reference numeral 1 shown in FIG. 13 denotes a short optical pulse source. Each of reference numerals 2A, 4A and 5A denotes a polarized beam-preserving optical fiber, a reference numeral 28 denotes an optical waveguide, a reference numeral 29 denotes a wave plate, a reference numeral 30 denotes a polarized beam splitter, a reference numeral 31 denotes a multiplexing unit, a reference numeral 32 denotes an optical fiber, a reference numeral 33 denotes a mode size converter, and a reference numeral 36 denotes an optical waveguide.

The fourth embodiment is substantially same as the second embodiment described above in the optical construction and function of the optical system between the short optical pulse source 1 and the optical fiber 32 and, thus, the detailed description thereof is omitted. The mode size converter 33 is arranged in order to convert the mode size from the mode diameter of, for example, the optical fiber into the mode diameter of the optical waveguide 28 so as to suppress the optical coupling loss caused by the difference in the mode diameter, as in the second embodiment. In the LSI apparatus shown in FIG. 13, the mode size converter 33 is optically coupled with the optical waveguide plate 36 formed independently of the LSI chip 8 in place of being coupled with the LSI chip 8. In other words, the optical waveguide 28 is formed on the optical waveguide plate 36, not on the LSI chip 8.

An optical waveguide of, for example, a SiON/SiO$_2$ system having a difference in refractive index of 0.07, and a core size of 1.2 μm□ is formed on the optical waveguide plate 36 and a wiring of the same length is mounted to a so-called "H-tree" type branch. In this embodiment, a polymer optical waveguide formed of, for example, a fluorinated polyimide can be used as the optical waveguide 28. A transparent substrate such as a quartz substrate or a sapphire substrate can be used for forming the optical waveguide plate 36 that is used for forming the optical waveguide 28.

In the system shown in FIG. 13, the linearly polarized beam supplied from the short optical pulse source 1 is separated into two light beams. One of the two linearly polarized light beams is retarded by the time period corresponding to ½ of the pulse period, and the two divided light beams are transmitted separately through the polarized beam-preserving optical fibers 4A and 5A so as to be supplied into the multiplexing element 31 such that the polarizing planes of the two polarized beams are perpendicular to each other. Then, a multiplexeed pulse train is generated from the polarized beam multiplexing element 31. A 90° optical converter (e.g., a 45° mirror or a diffraction grating) mounted to the optical waveguide plate 36 permits the LSI chip 8 to be irradiated with the multiplexed pulse. The irradiating light is received by two photodiodes of the polarization separation type or the polarization selective type described previously, with the result that an electric clock pulse is generated as in the first embodiment in accordance with the set pulse and the reset pulse.

Figure 14:
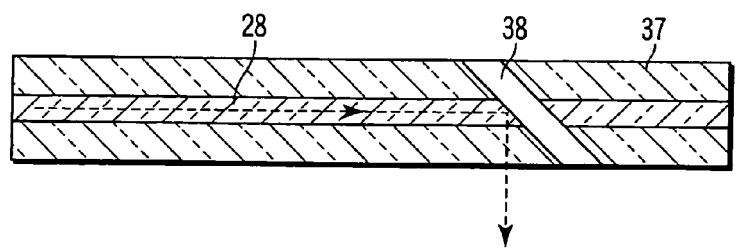
FIG. 14 is a cross sectional view schematically showing a construction of an optical member for changing the light path by 90°, which is included in the LSI system shown in FIG. 13.

FIG. 14 exemplifies the construction of the 45° mirror mounted to the optical waveguide for changing the direction of the optical path of the waveguide beam by 90°. A reference numeral 38 shown in FIG. 14 denotes a low refractive index gap such as an air gap or a buried mirror, and a reference numeral 37 denotes a clad surrounding the core acting as the optical waveguide 28. As shown in FIG. 14, the core acting as the optical waveguide 28 and the clad are collectively processed so as to be imparted with an inclined surface of 45°, and a low refractive index gap or a mirror is mounted to the inclined surface.

Alternatively, it is possible to mount a local polarized wave separator for separating the optical beam guided to the optical waveguide plate 36 into an optical beam having polarizing planes perpendicular to each other, and after the set pulse and the reset pulse corresponding to the light beams having polarizing planes perpendicular to each other are separated, the direction of the optical path is changed by the 90° optical path converter so as to permit the LSI chip 8 to be irradiated with the light beam. In this case, the light beam is received by two ordinary photodiodes whose detection characteristics are not dependent on the polarization, and an electric clock pulse is generated as in the first embodiment in accordance with the set pulse and the reset pulse.

As described above, according to the fourth embodiment of the present invention, it is of course possible to obtain the effect similar to that obtained in the second embodiment described previously. In addition, the fourth embodiment produces an effect that the optical wirings for the LSI chip 8 can be prepared separately, and the optical waveguide can be manufactured relatively easily by using a cheap polymer material.

Fifth Embodiment

Figure 15:
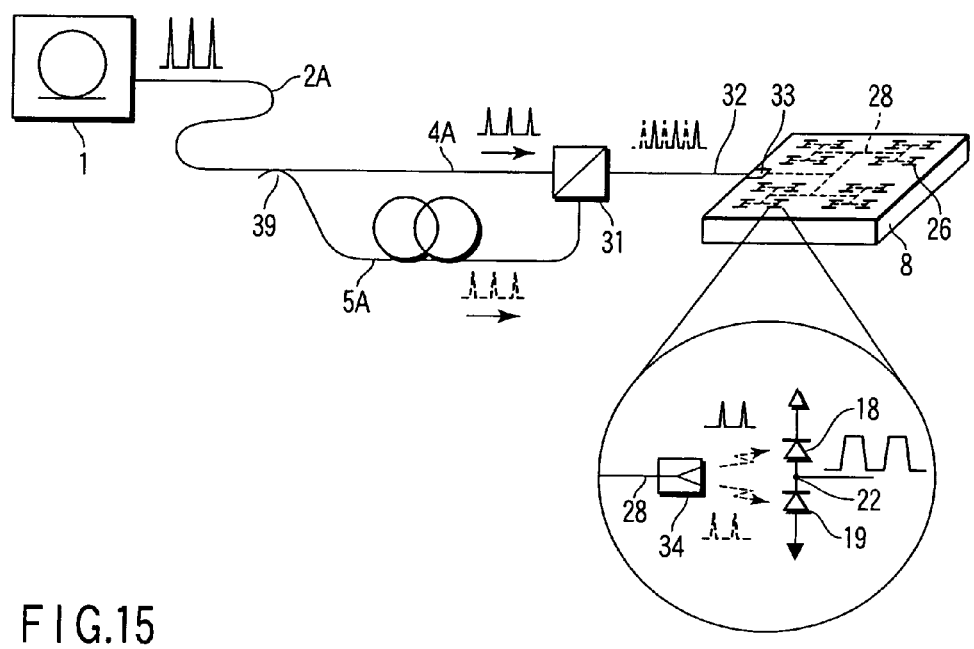
FIG. 15 schematically shows an optical waveguide arrangement of an LSI system operated by an optical clock according to a fifth embodiment of the present invention.

FIG. 15 schematically shows the construction of an optical clock LSI according to a fifth embodiment of the present invention. A reference numeral 1 shown in FIG. 15 denotes a short optical pulse source. Each of reference numerals 2A, 4A and 5A denotes a polarized beam-preserving optical fiber, a reference numeral 8 denotes an LSI chip or an LSI apparatus, a reference numeral 18 denotes a photodiode for the set pulse, a reference numeral 19 denotes a photodiode for the reset pulse, a reference numeral 22 denotes the connecting point between the anode of the photodiode 18 for the set pulse and the cathode of the photodiode 19 for the reset pulse, a reference numeral 28 denotes an optical waveguide, a reference numeral 31 denotes a multiplexing unit, a reference numeral 32 denotes an optical fiber, a reference numeral 33 denotes a mode size converter, a reference numeral 34 denotes a local polarization separator connected to the terminal of the optical waveguide, and a reference numeral 39 denotes a polarization-preserving fiber coupler.

A mode lock fiber laser having, for example, a pulse width of 10 ps and a repeating frequency of 10 GHz is used as the short optical pulse source 1. If a polarized beam-preserving optical fiber is used in the mode lock fiber laser, and if a PrYb-doped fiber is used as a gain medium, it is possible to achieve the oscillation wavelength of 635 nm or 720 nm in terms of the linearly polarized wave output, and it is possible for even a Si-based photo sensor to receive directly the oscillated wave. Also, an oscillating wavelength of 1.55 µm is used in many cases in the mode lock fiber laser for the optical communication, which uses an Er-doped fiber as the gain medium. In this case, it is advisable to use, for example, a GaInAs/InP series element as the photo sensor.

A 3 dB coupler prepared by the tapered fusion of a polarized beam-preserving optical fiber is used as the polarized beam-preserving optical fiber coupler 39. The polarized beam-preserving optical fiber 5A is set longer than the polarized beam-preserving optical fiber 4A by the distance corresponding to ½ of the clock period. It is advisable to set the retarding amount of the optical fiber 5A, i.e., the difference in length between the optical fibers 4A and 5A, at 10.2 mm in the case where the polarized beam-preserving optical fibers 4A and 5A have an effective refractive index of about 1.47 (delay time of 50 ps and the clock frequency of 10 GHz).

After a prescribed retarding time is imparted, the linearly polarized light beams supplied into the polarized beam-preserving optical fibers 4A and 5A are further supplied into the multiplexing element 31 such that the polarizing planes of the polarized light beams are perpendicular to each other and, then, the composed polarized light beam is generated from the optical fiber 32. It is desirable to use a so-called "collimate system" in which a collimate lens (not shown) is mounted to the edge of each of the optical fibers for the light input-output in and out of the multiplexing element 31.

The constructions of the optical fiber 32, the mode size converter 33 and the local polarized wave separator 34, etc. are similar to those in the second embodiment and, thus, the detailed description thereof is omitted.

In the fifth embodiment of the present invention, the linearly polarized light beam emitted from the short optical pulse source 1 is separated or de-multiplexed into two light beams by the polarized beam-preserving optical fiber coupler 39. The two linearly polarized light beams are separately transmitted by the polarized beam-preserving optical fibers 4A and 5A so as to be supplied into the multiplexing element 31 such that the polarizing planes of the polarized light beams are perpendicular to each other. In this case, the optical path of the polarized beam-preserving fiber 5A is set longer than that of the polarized beam-preserving fiber 4A such that the linearly polarized optical wave transmitted through the polarized beam-preserving fiber 5A is delayed by the time corresponding to ½ of the pulse period. As a result, the optical waves or beams transmitted through the polarized beam-preserving optical fibers 4A and 5A are composed in the multiplexing element 31, with the result that a multiplexed optical pulse train is generated from the polarized beam multiplexing element 31. The multiplexed optical pulse train in this case differs from the simple multiplexed optical pulse train in that the polarizing planes of the polarized waves are perpendicular to each other for each pulse and two independent optical beams are actually present together in a mixed form.

The multiplexed pulse is introduced into the optical waveguide 28 of the LSI chip 8 as in the second embodiment, and in the clock distributing point of the optical waveguide 28, the multiplexed pulse train is brought back to the two linearly polarized light beams (short optical pulse train) by the local polarized beam separator 34. Then, an electric clock pulse can be formed as in the first embodiment by supplying the short optical pulse train into the photodiode 18 for the set pulse and into the photodiode 19 for the reset pulse.

Incidentally, the construction of the system ranging between the optical fiber 32 and the LSI is similar to that shown in FIG. 9. However, it is possible to substitute the construction shown in FIG. 10 or FIG. 13 for the construction shown in FIG. 15.

As described above, according to the fifth embodiment of the present invention, it is possible to form the two linearly polarized beams by using a optical fiber network. In this case, it is unnecessary to adjust the optical element, and the optical system is substantially free from the change with time. It follows that, even in the case of using a short optical pulse source of a large output, it is possible to suppress the trouble that the laser beam is caused to leak or a damage is done to the optical element by a slight deviation of the optical axis.

Sixth Embodiment

Figure 16:
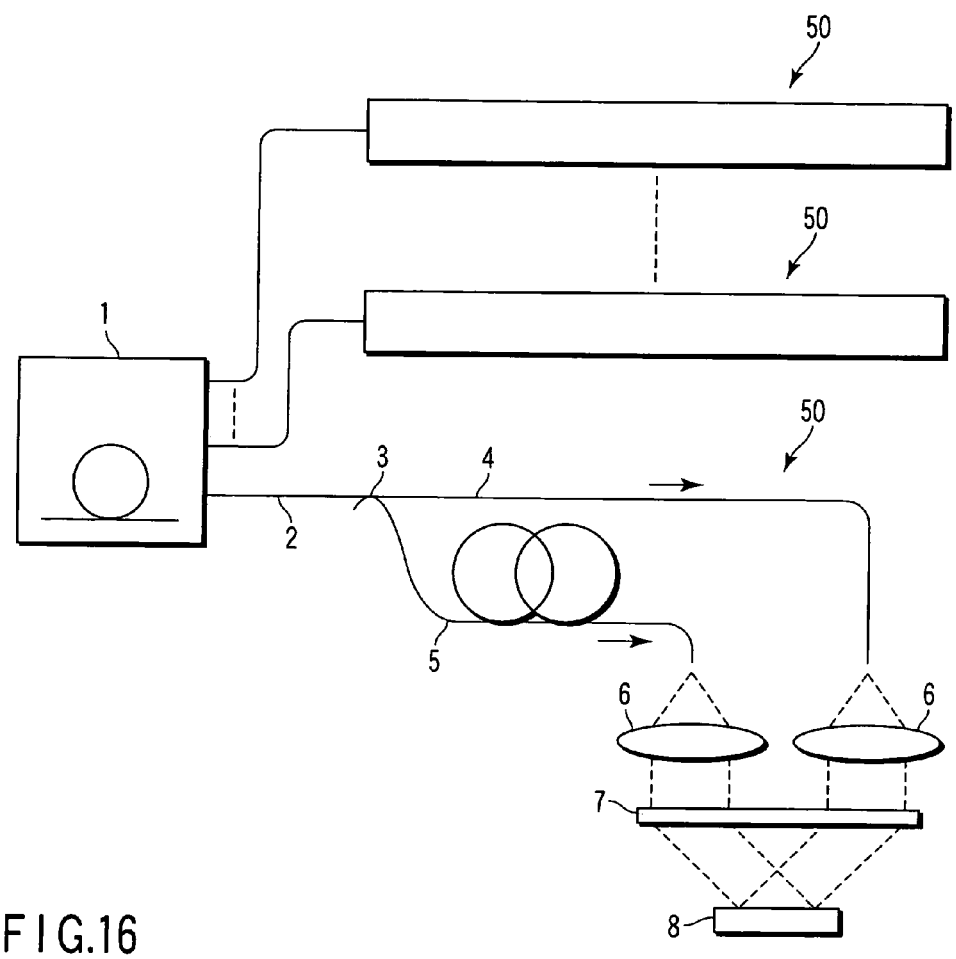
FIG. 16 schematically shows an optical waveguide arrangement of an LSI system operated by an optical clock according to a sixth embodiment of the present invention.

FIG. 16 schematically shows the construction of an optical clock LSI system according to a sixth embodiment of the present invention.

A reference numeral 1 shown in FIG. 16 denotes a short optical pulse source, a reference numeral 2 denotes an optical fiber, a reference numeral 3 denotes an optical demultiplexer, i.e., a two-branching optical fiber coupler, each of reference numerals 4 and 5 denotes an optical fiber, a reference numeral 6 denotes a collimate lens, a reference numeral 7 denotes a diffraction grating, and a reference numeral 8 denotes an LSI chip or a LSI apparatus. The optical fiber 5 is set longer than the optical fiber 4 by the distance corresponding to ½ of the clock period. An optical clock system 50 including the optical fibers 2, 4, 6, the coupler 3, the collimator 6, the diffraction grating 7 and the LSI chip 8 or the LSI apparatus have a substantially same configuration as that of the system shown in FIG. 3 and, thus, the description thereof is omitted. In the system shown in FIG. 16, a plurality of optical clock systems 50 are arranged such that the short optical pulse generated from the single short optical pulse source 1 is supplied to the plural optical clock systems 50.

Incidentally, the construction of the optical clock system 50 is not limited to the construction for the first embodiment. It is possible to change the construction of the optical clock system 50 to that for any of the second to fifth embodiments described above.

If the optical clock system 50 is constructed as in any of the first to fifth embodiments described above, each optical clock system 50 produces an effect similar to that produced in the first embodiment. Also, if the optical fibers 2 included in the optical clock system 50 are made equal to each other in length, it is possible to permit the logic circuit to realize the synchronized operation even among the different optical clock systems 50.

According to the present invention, the number of divisions of the short optical pulse is minimized so as to carry out the simultaneous distribution by utilizing the multiplex space so as to ensure the uniform length of the clock distribution and the uniform intensity of the set pulse and the reset pulse. Alternatively, it is possible to secure the uniform intensity of the set pulse and the reset pulse by the multiplex polarization of the set pulse and the reset pulse so as to permit the same optical route to achieve the wiring of the same length. In this case, it is possible to realize the optical clock LSI free from an excessive jitter caused by the signal-receiving circuit and low in the space dispersion or change with time in the jitter caused by the clock distribution route. In other words, it is possible to carry out the clock distribution to the LSI, said clock being subjected to a high speed signal processing, by utilizing light. In addition, it is possible to markedly diminish the clock distribution jitter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus, comprising: a Large Scale Integrated Circuit (LSI) apparatus including a semiconductor device, a plurality of first and second photodiodes formed at the semiconductor device, and electrical clock output terminals formed at the semiconductor device, each of the electrical clock output terminals being electrically connected to the first and second photodiodes, the first and second photodiodes independently sensing first and second short optical pulse trains which have different phases and are incident from the outside of the LSI apparatus and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the semiconductor device, wherein the LSI apparatus further includes an input port configured to input an optical beam in which the first and second short optical pulse trains are multiplexed, a demultiplexer configured to de-multiplex the optical beam into the first and second short optical pulse trains, an optical guide configured to guide the optical beam to the demultiplexer from the input port.

2. The apparatus according to claim 1, wherein the first and second photodiodes are so arranged to receive the first and second optical pulse trains from different directions.

3. The apparatus according to claim 1, wherein the first and second short optical pulse trains are collimated so as to have a beam size substantially same as or larger than the size of the LSI apparatus.

4. The apparatus according to claim 1, wherein the electric clock pulse has a predetermined clock cycle period, and the phase difference between the first and second pulse trains is set to have a half of the clock cycle period.

5. The apparatus according to claim 1, wherein the electric clock pulse has a predetermined cycle period, and each of the first and second optical pulse train have a pulse width which is not larger than ½ of the predetermined cycle period.

6. The apparatus according to claim 1, wherein each of the first and second photodiodes includes anode and cathode, and each of the electrical clock output terminals includes a connecting point connecting the anode of the first photodiode to the cathode of the second photodiode, the electric clock pulse being output from the connecting points.

7. The apparatus according to claim 1, wherein the first and second photodiodes include stray capacitors and the connecting point is connected to the capacitors in the first and second photodiodes.

8. The apparatus according to claim 1, wherein the LSI apparatus further includes first and second filters formed on the first and second photodiodes, the first and second filters permit the first and second short optical pulse trains to pass therethrough, respectively.

9. The apparatus according to claim 1, wherein the LSI apparatus further includes first and second optical elements formed on the first and second photodiodes, the first and second elements selectively guide the first and second short optical pulse trains to the first and second photodiodes, respectively.

10. The apparatus according to claim 1, further comprising an optical system configured to direct the first and second short optical pulse trains to the first and second photodiodes.

11. The apparatus according to claim 10, wherein the LSI apparatus further includes the first and second optical elements formed at the first and second photodiodes, which selectively guide the first and second short optical pulse trains in the optical beam to the first and second photodiodes, respectively.

12. A system, comprising:

an optical source configured to generate a short optical pulse train having a pulse period;

an optical divider configured to divide the short optical pulse train from the optical source into first and second short optical pulse trains;

a retarding member configured to retard one of the first and second short optical pulse trains by the time corresponding to ½ of the pulse period;

a Large Scale Integrated Circuit (LSI) chip provided with a plurality of first and second photodiodes and electrical clock output terminals each electrically connected to the first and second photodiodes, the first and second photodiodes independently sensing the first and second short optical pulse trains and converting the first and second short optical pulse trains to first and second electric current pulse trains, respectively, and the first and second electric current pulse trains being supplied to each of the electrical clock output terminals so that each of the electrical clock output terminals generates an electric clock pulse; and an optical system configured to guide the first and second short optical pulse trains from the retarding member to the first and second photodiodes, respectively, wherein the optical system includes an expander configured to expand the first and second short optical pulse trains in a size substantially same as the size of the LSI chip and collimate the first and second short optical pulse trains and a directing optical element configured to direct the first and second collimated short optical pulse trains to the LSI chip and project the first and second collimated short optical pulse trains on the LSI chip so as to maintain a phase difference between the first and second collimated short optical pulse trains.

13. The system according to claim 12, wherein the optical system includes transfer optical elements configured to transfer first and second short optical pulse trains to the first and second photodiodes, respectively, so that the first and second photodiodes receives the first and second optical pulses from different directions.

14. The system according to claim 12, wherein the expander includes a collimate lens expanding first and second optical pulse trains, and the directing optical element includes a diffraction grating redirecting the first and second short optical pulse train to the LSI chip.

15. The system according to claim 12, wherein the electric clock pulse has a predetermined cycle period, and the optical source generates the short optical pulse train having a pulse width which is not larger than ½ of the predetermined cycle period.

16. The system according to claim 15, wherein the first and second photodiodes include capacitors and the connecting point is connected to the capacitors in the first and second photodiodes.

17. The system according to claim 12, wherein each of the first and second photodiodes includes anode and cathode, and each of the electrical clock output terminals includes a connecting point connecting the anode of the first photodiode to the cathode of the second photodiode, the electric clock pulse being output from the connecting points.

18. A system, comprising:
an optical source configured to generate a short optical pulse train having a pulse period;
an optical divider configured to divide the short optical pulse train from the optical source into first and second short optical pulse trains which are linearly polarized in first and second planes, respectively;
a retarding member configured to retard one of the first and second short optical pulse trains by the time corresponding to ½ of the pulse period;
a multiplexing unit configured to multiplex the first and second short optical pulse trains into a multiplexed optical pulse train having the first and second linearly polarized planes;
a Large Scale Integrated Circuit (LSI) chip provided with a plurality of first and second photodiode structures and electrical clock output terminals each electrically connected to the first and second photodiode structures, the first and second photodiode structures selectively sensing the first and second short optical pulse trains in the multiplexed optical pulse train and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the LSI; and
an optical system configured to guide the multiplexed optical pulse train from the multiplexing unit to the first and second photodiode structures.

19. The system according to claim 18, wherein the optical system includes an expander configured to expand the multiplexed optical pulse train in a size substantially same as the size of the LSI chip and collimate the multiplexed optical pulse train and project the multiplexed optical pulse train on the LSI chip.

20. The system according to claim 18, wherein the first and second photodiode structures includes first and second polarizing filters having different polarizing directions, which separates the multiplexed optical pulse train into the first and second short optical pulse trains, respectively.

21. The system according to claim 18, wherein the optical system includes optical guide plate configured to guide the multiplexed optical pulse train to the first and second photodiode structures so as to maintain a phase difference between the first and second short optical pulse trains.

22. The system according to claim 18, wherein the LSI chip further includes an optical waveguide configured to guide the multiplexed optical pulse train to the first and second photodiode structures so as to maintain a phase difference between the first and second short optical pulse trains.

23. The system according to claim 18, wherein the electric clock pulse has a predetermined cycle period, and the optical source generates the short optical pulse train having a pulse width which is not larger than ½ of the predetermined cycle period.

24. The system according to claim 18, wherein each of the first and second photodiode structures includes anode and cathode, and each of the electrical clock output terminals includes a connecting point connecting the anode of the first photodiode structure to the cathode of the second photodiode structure, the electric clock pulse being output from the connecting points.

25. A system, comprising:
an optical source configured to generate a short optical pulse train having a pulse width and a pulse period, the short optical pulse being in circular polarization;
a first optical fiber configured to guide the short optical pulse train so as to maintain the circular polarization of the short optical pulse train;
an optical divider configured to divide the short optical pulse train guided from the first optical fiber into first and second short optical pulse trains which are in linear polarization in first and second planes, respectively;
a second optical fiber configured to guide the first short optical pulse train so as to maintain the linear polarization in the first plane;
a third optical fiber configured to guide the second short optical pulse train so as to maintain the linear polarization in the second plane, a retardation of ½ of the pulse period being produced between the first and second short optical pulse trains;
a multiplexing unit configured to multiplex the first and second short optical pulse trains into a multiplexed optical pulse train having the first and second linearly polarized planes;
a Large Scale Integrated Circuit (LSI) chip provided with a plurality of first and second photodiode structures and electrical clock output terminals each electrically connected to the first and second photodiode structures, the first and second photodiode structures selectively sensing the first and second short optical pulse trains in the multiplexed optical pulse train and converting the first and second short optical pulse trains to first and second electric current pulse trains, respectively, and the first and second electric current pulse trains being supplied to each of the electrical clock output terminals so that each of the electrical clock output terminals generates an electric clock pulse; and
an optical system configured to guide the multiplexed optical pulse train from the multiplexing unit to the first and second photodiode structures.

26. The system according to claim 25, wherein first and second photodiode structures includes first and second polarizing filters having different polarizing directions, which separates the multiplexed optical pulse train into the first and second short optical pulse trains, respectively.

27. The system according to claim 25, wherein the LSI chip further includes an optical waveguide configured to guide the multiplexed optical trains to the first and second photodiode structures so as to maintain a phase difference between the first and second short optical pulse trains.

28. The system according to claim 25, wherein the optical system includes a fourth optical fiber guiding the multiplexed optical pulse train.

29. An apparatus, comprising: a Large Scale Integrated Circuit (LSI) apparatus including a semiconductor device, a plurality of first and second photodiodes formed at the semiconductor device, and electrical clock output terminals formed at the semiconductor device, each of the electrical clock output terminals being electrically connected to the first and second photodiodes, the first and second photodiodes independently sensing first and second short optical pulse trains which have different phases and are incident from the outside of the LSI apparatus and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the semiconductor device, further comprising an optical system configured to transmit an optical beam in which the first and second short optical pulse trains are multiplexed and guide the optical beam to the LSI apparatus.

30. An apparatus, comprising: a Large Scale Integrated Circuit (LSI) apparatus including a semiconductor device, a plurality of first and second photodiodes formed at the semiconductor device, and electrical clock output terminals formed at the semiconductor device, each of the electrical clock output terminals being electrically connected to the first and second photodiodes, the first and second photodiodes independently sensing first and second short optical pulse trains which have different phases and are incident from the outside of the LSI apparatus and converting the first and second short optical pulse trains to first and second electric current pulse trains, respectively, and the first and second electric current pulse trains being supplied to each of the electrical clock output terminals so that each of the electrical clock output terminals generates an electric clock pulse supplied to the semiconductor device, further comprising an optical system configured to direct the first and second short optical pulse trains to the first and second photodiodes, wherein the LSI apparatus further includes the first and second optical elements formed at the first and second photodiodes, which selectively guide the first and second short optical pulse trains in the optical beam to the first and second photodiodes, respectively.

31. A system, comprising:

an optical source configured to generate a short optical pulse train having a pulse period;

an optical divider configured to divide the short optical pulse train from the optical source into first and second short optical pulse trains;

a retarding member configured to retard one of the first and second short optical pulse trains by the time corresponding to ½ of the pulse period;

a Large Scale Integrated Circuit (LSI) chip provided with a plurality of first and second photodiodes and electrical clock output terminals each electrically connected to the first and second photodiodes, the first and second photodiodes independently sensing the first and second short optical pulse trains and converting the first and second short optical pulse trains to first and second electric current pulse trains, respectively, and the first and second electric current pulse trains being supplied to each of the electrical clock output terminals so that each of the electrical clock output terminals generates an electric clock pulse; and an optical system configured to guide the first and second short optical pulse trains from the retarding member to the first and second photodiodes, respectively, wherein the optical divider includes an optical divider member to divide the short optical pulse train into the first and second short optical pulse trains, the retarding member includes first and second optical waveguides transmitting the first and second short optical pulse trains, respectively, the first and second waveguides having differ optical path lengths, the expander includes a collimate lens expanding the first and second optical pulse trains, and the directing optical element includes a diffraction grating redirecting the short optical pulse train to the LSI chip.

* * * * *